Feb. 4, 1941.  W. C. SANDERS  2,230,912
INBOARD AXLE CONSTRUCTION
Filed Nov. 13, 1939   2 Sheets-Sheet 1
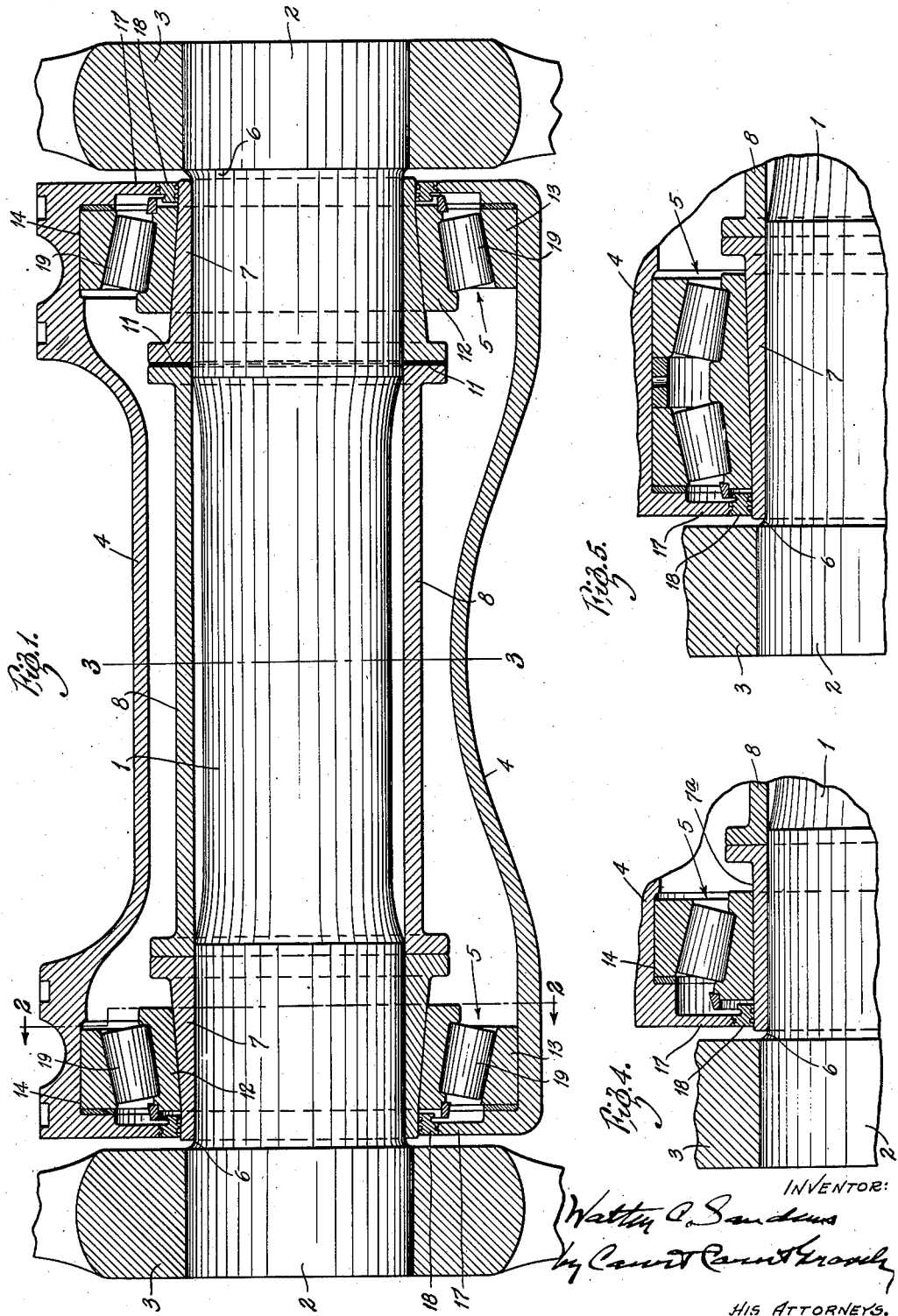

Feb. 4, 1941. W. C. SANDERS 2,230,912
INBOARD AXLE CONSTRUCTION
Filed Nov. 13, 1939 2 Sheets-Sheet 2
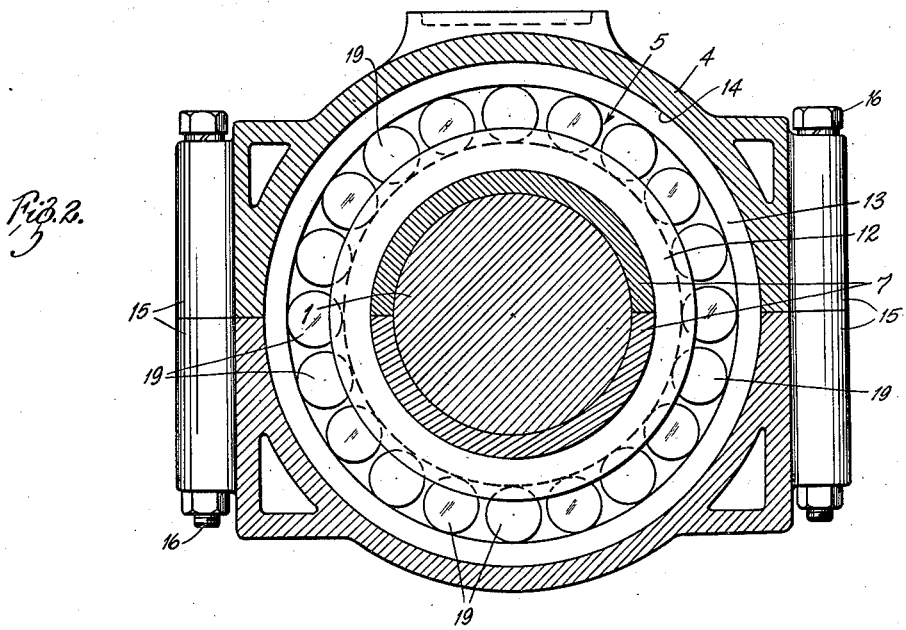
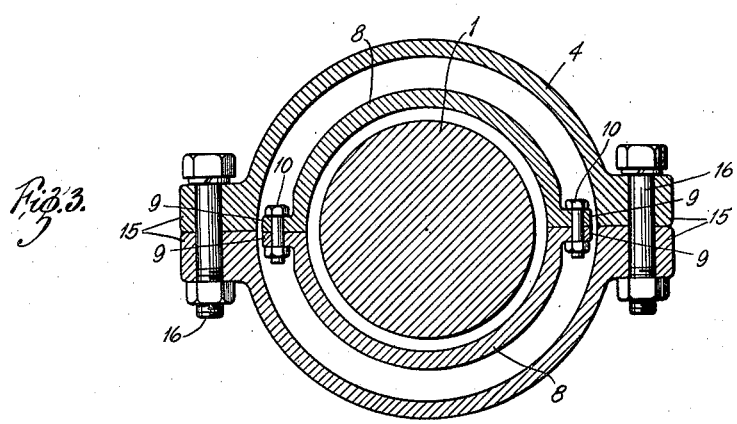
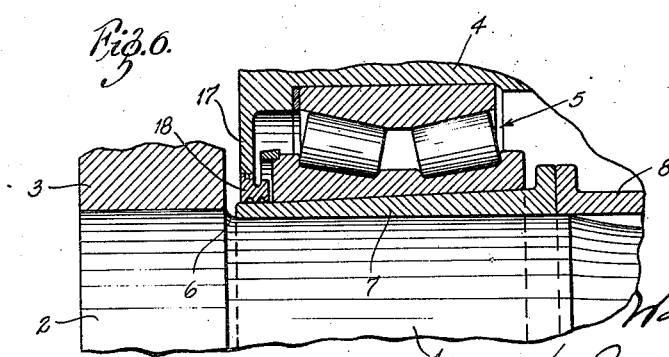
INVENTOR:
Walter C. Sanders
HIS ATTORNEYS.

Patented Feb. 4, 1941

2,230,912

UNITED STATES PATENT OFFICE 2,230,912

INBOARD AXLE CONSTRUCTION

Walter C. Sanders, Canton, Ohio, assignor to The Timken Roller Bearing Company, Canton, Ohio, a corporation of Ohio Application November 13, 1939, Serial No. 303,967

5 Claims. (Cl. 295—36)

My invention relates to the type of axle construction wherein roller bearings, located inwardly of the wheels, are interposed between the axle and the axle housing or box. In this type of construction, there may be a tendency for the axle to fail by fatigue inside of the hub of the wheel close to the inner end of said hub. The principal object of the present invention is to devise a construction that will minimize the danger of failure of the axle in the wheel seat by fatigue and at the same time permit the use of roller bearings with continuous inner raceway members. The invention consists in the combination of parts hereinafter described and claimed.

In the accompanying drawings, wherein like reference numerals refer to like parts wherever they occur, Fig. 1 is a longitudinal sectional view of a construction embodying my invention, Fig. 2 is a cross-section thereof on the line 2—2 of Fig. 1, Fig. 3 is a cross-section on the line 3—3 of Fig. 1; and Figs. 4, 5 and 6 are sectional detail views of different forms of roller bearings suitable for use in my construction.

The construction shown in Fig. 1 comprises a live axle 1 with wheel seats 2 formed on the ends thereof, wheels 3 whose hubs are press-fitted on said wheel seats, a housing 4 which encloses the body portion of the axle, and roller bearings 5 interposed between the end portions of the housing and the dead axle.

In order to relieve the stresses that cause fatigue of the axle 1, its wheel seat portions 2 are made of larger diameter than the portions of the axles inwardly of said wheel seats, and the shoulders 6 thus formed are concaved or tapered to avoid abrupt change of diameter.

Longitudinally split adapter sleeves 7 are mounted on the axle near the wheels. These split sleeves are of greater length than the bearings 5 and throughout the greater portion of their length, the outer surfaces of said split sleeves taper outwardly, that is, toward the wheels adjacent to them respectively. The wall thickness of the tapered sleeves at the small end thereof is such that the outside diameter of the sleeves is greater than the diameter of the wheel seats. The split tapered sleeves for the respective bearings are kept properly spaced apart by a longitudinally split sleeve 8 that encloses the middle portion of the axle and has its ends abutting against the inner ends of said tapered sleeves. The meeting edge portions of the sections of said spacing sleeve are provided with perforated ribs or lugs 9 which receive bolts 10 for holding them in proper relation. One or more shims 11 may be interposed between one or both ends of the spacing sleeve and the adjacent tapered sleeve or sleeves to effect proper adjustment thereof.

The inner raceway members 12 of the bearings are continuous one-piece rings whose bores taper conformably to the outer surfaces of the tapered sleeves on which they fit. The bore of the inner raceway members is of greater diameter than that of the wheel seats and therefore said inner bearing members can be slipped over said wheel seats without affecting the circumferential continuity of said inner raceway members.

The outer raceway members 13 of the bearings are also one-piece circumferentially continuous rings. In order to receive the outer raceway members, grooves 14 are formed in the inner surfaces of the housing sections near the ends thereof and the outer raceway members are positioned in said grooves before the housing sections are brought together and fastened. For fastening the housing sections together, their meeting portions are provided with perforated ribs or lugs 15 through which extend fastening bolts 16. Preferably the endmost portion of the housing sections have flanges 17 thereon that extend inwardly fairly close to the small ends of the tapered sleeves and the space between said flanges and the axle is closed by a suitable oil sealing ring 18.

Suitable rollers 19 are interposed between the inner and outer raceway members of the bearings. In the construction illustrated in Fig. 1, each bearing has a single series of rollers that taper outwardly, that is, toward the ends of the axle; but bearings of other types may be used. For instance, Fig. 4 shows a bearing wherein the rollers taper inwardly, that is, toward the middle of the axle and wherein the outer surface of the split sleeve 7a is made cylindrical instead of conical. Fig. 5 shows a double-row bearing with the rollers of the respective rows tapering away from each other; and Fig. 6 shows a double row bearing wherein the rollers of the two rows taper toward each other.

The operation of assembling my construction is as follows: The tapered or straight sleeves, the spacing sleeves and the shims are applied to the axle and then the bearings and oil sealing ring are applied by slipping them over the wheel seats of the axle. Then the two sections of the housing are brought together and bolted with the outer raceway members positioned in the grooves or seats provided therefor in the end portions of the housing. In this operation, the oil ring, which has been previously slipped over the tapered sleeves, is positioned or clamped between the inturned end flanges of the housing sections.

My invention is especially important in connection with locomotive axles wherein the fatigue stress may be relieved by the enlargement of the wheel seat and the coning of the shoulder formed by such enlargement. However, the invention is applicable to other constructions wherein there is an axle or shaft with enlarged portions that are spaced apart and wherein it is desired to mount a roller bearing without interrupting the continuity of its raceway surfaces.

What I claim is:

1. The combination of an axle having spaced apart portions of larger diameter than the portion of the axle between them, tapered shoulders joining the portions of different diameters, wheels pressfitted on the portions of larger diameter, a longitudinally split adapter sleeve mounted on said axle between said enlarged portions, the outside diameter of said split sleeve being greater than the diameter of said enlarged portions, a continuous inner raceway member mounted on said adapter sleeve, the diameter of the bore of said inner raceway member being greater than the diameter of said enlarged portions of the axle, a longitudinally split housing enclosing the body portion of said axle and having a seat for an outer raceway member, a continuous outer raceway member in said seat, and rollers between said inner and outer raceway members.

2. The combination of an axle having spaced apart portions of larger diameter than the portion of the axle between them, tapered shoulders joining the portions of different diameters, wheels pressfitted on the portions of larger diameter, longitudinally split adapter sleeves mounted on said axle between said enlarged portions, the outside diameter of said split sleeves being greater than the diameter of said enlarged portions, continuous inner raceway members on said adapter sleeves, the diameter of the bore of said inner raceway members being greater than the diameter of said enlarged portions, a split sleeve enclosing said axle and spacing apart said inner raceway members, a longitudinally split housing enclosing the portion of said axle between said enlarged portions and having seats in its ends, continuous outer raceway members in said seats, and rollers between said inner and outer raceway members.

3. The combination of an axle having spaced apart portions of larger diameter than the portion of the axle between them, tapered shoulders joining the portions of different diameters, wheels pressfitted on the portions of larger diameter, longitudinally split outwardly tapering adapter sleeves mounted on said axle between said enlarged portions, the outside diameter of said split sleeves being greater than the diameter of said enlarged portions, continuous inner raceway members with tapering bores fitting said adapter sleeves, the diameter of the bore of said inner raceway members being greater than the diameter of said enlarged portions, a split sleeve enclosing said axle and spacing apart said inner raceway members, a longitudinally split housing enclosing the portion of said axle between said enlarged portions and having seats in its ends, continuous outer raceway members in said seats, and rollers between said inner and outer raceway members.

4. The combination of an axle having at its ends wheel seats of larger diameter than the adjacent portions of the axle, wheels pressfitted on said wheel seats, longitudinally split adapter sleeves mounted on said axle near said wheel seats, the outside diameter of said split sleeves being greater than the diameter of said wheel seats, continuous inner raceway members on said adapter sleeves, the diameter of the bore of said inner raceway members being greater than the diameter of the wheel seats, a split sleeve enclosing said axle and spacing apart said inner raceway members, a split housing enclosing the body portion of said axle and having seats in its ends, continuous outer raceway members in said seats and rollers between said inner and outer raceway members.

5. The combination of an axle having at its ends wheel seats of larger diameter than the adjacent portions of the axle, wheels pressfitted on said wheel seats, longitudinally split outwardly tapering adapter sleeves mounted on said axle near said wheel seats, the outside diameter of said split sleeves being greater than the diameter of said wheel seats, continuous inner raceway members with tapering bores fitting said adapter sleeves, the diameter of the bore of said inner raceway members being greater than the diameter of the wheel seats, a split sleeve enclosing said axle and spacing apart said inner raceway members, a split housing enclosing the body portion of said axle and having seats in its ends, continuous outer raceway members in said seats and rollers between said inner and outer raceway members.

WALTER C. SANDERS.